US007831561B2

(12) United States Patent
Wertheimer et al.

(10) Patent No.: US 7,831,561 B2
(45) Date of Patent: Nov. 9, 2010

(54) AUTOMATED DISK-ORIENTED BACKUPS

(75) Inventors: Steven C. Wertheimer, Kentfield, CA (US); Juan R. Loaiza, Redwood City, CA (US); Muthu Olagappan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 443 days.

(21) Appl. No.: 10/849,474

(22) Filed: May 18, 2004

(65) Prior Publication Data

US 2005/0273476 A1    Dec. 8, 2005

(51) Int. Cl.
*G06F 7/00*  (2006.01)
*G06F 17/00*  (2006.01)
(52) U.S. Cl. ...................... 707/640; 707/653
(58) Field of Classification Search ........................ None
See application file for complete search history.

(56) References Cited

U.S. PATENT DOCUMENTS

| | | | | | |
|---|---|---|---|---|---|
| 5,535,381 | A | * | 7/1996 | Kopper | 710/52 |
| 6,003,044 | A | | 12/1999 | Pongracz et al. | 707/204 |
| 6,377,959 | B1 | * | 4/2002 | Carlson | 707/202 |
| 6,978,279 | B1 | * | 12/2005 | Lomet et al. | 707/202 |
| 7,136,882 | B2 | * | 11/2006 | Collins et al. | 707/204 |
| 2003/0110190 | A1 | * | 6/2003 | Achiwa et al. | 707/203 |
| 2003/0126163 | A1 | * | 7/2003 | Kim et al. | 707/204 |
| 2003/0163493 | A1 | * | 8/2003 | Burns et al. | 707/204 |
| 2004/0122873 | A1 | * | 6/2004 | Wright et al. | 707/205 |
| 2005/0080810 | A1 | * | 4/2005 | Matsuura | 707/102 |
| 2007/0028063 | A1 | * | 2/2007 | Hars et al. | 711/162 |
| 2008/0243959 | A1 | * | 10/2008 | Bacastow et al. | 707/204 |

OTHER PUBLICATIONS

Mark Reed, "Reduce, reuse, recycle" Microsoft Windows 98; Using Windows 98: Getting your work done: Recycle Bin, Lat updated Dec. 8, 1999, pp. 1.
2000 Microsoft, "Recycle Bin overview"; Last updated Feb. 28, 2000, pp. 1-6.

* cited by examiner

*Primary Examiner*—Neveen Abel Jalil
*Assistant Examiner*—Raheem Hoffler
(74) *Attorney, Agent, or Firm*—Silicon Valley Patent Group LLP; Omkar Suryadevara

(57) ABSTRACT

Space on disk, designated for storage of recovery files is automatically managed so as to not exceed a predetermined limit. Specifically, after creation of information to be stored in a new recovery file, an automatic check is made to see if creation of the new recovery file will cause the space to exceed the limit. If so, at least one recovery file currently in the space is deleted. The new recovery file is automatically created, when the space occupied by existing recovery files becomes sufficiently small to accommodate the new file without exceeding the limit. The recovery file(s) deleted to make room for the new recovery file may be automatically identified in accordance with a user-specified policy. Such a policy may be used to automatically identify a subset of recovery files available for deletion, well ahead of time, i.e. prior to a need for deletion arises.

28 Claims, 5 Drawing Sheets

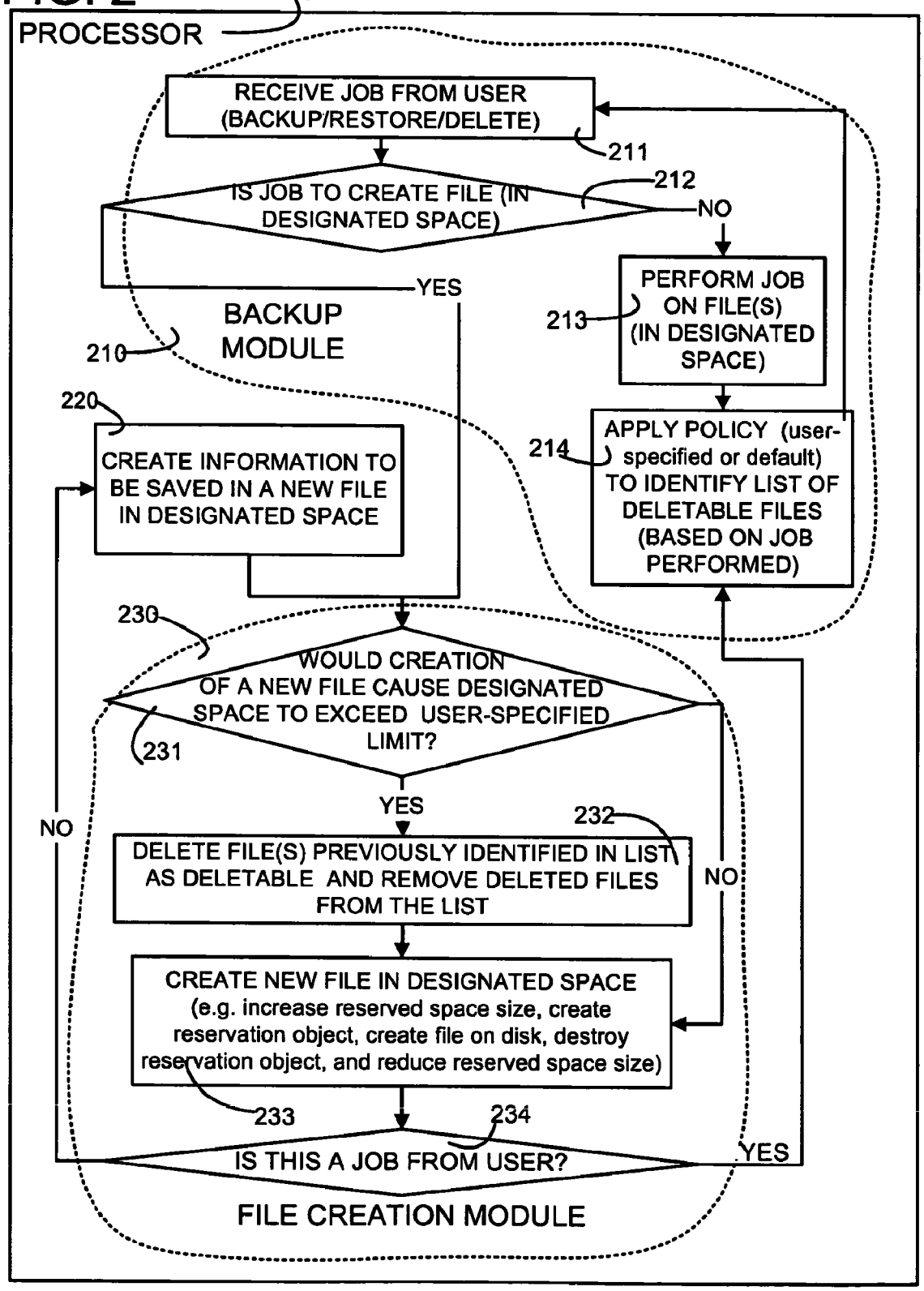

AUTOMATED DISK-ORIENTED BACKUPS

BACKGROUND

Computer files store information to be used by a computer. Such files are normally stored in nonvolatile storage devices, such as hard disks. As the storage devices are subject to failure, many computer files are backed up, by copying the files, in whole or in part, to another device (sometimes called "secondary storage"), such as an additional hard disk. During a full back up, a complete copy of a computer file is made. However, when the total number and size of the full backup files becomes too large, it becomes desirable to make just incremental back ups, wherein only changes from the last full back up (or the last incremental back up) are recorded.

Back ups of the type described above may be performed periodically, e.g. incremental back ups every hour, and/or full back ups every night. Over time, backup files in secondary storage eventually grow in size and/or number such that the secondary storage begins to fill up. If the secondary storage does fill up, no more backup files can be stored therein, and hence no back up can be done, unless some backup files are deleted from the secondary storage. Typically, a user manually performs another back up, this time back up files currently in the secondary storage are backed up to yet another device (sometimes called "tertiary storage"), typically removable media such as a magnetic tape or an optical disk. The user must then delete the manually backed up files from secondary storage, to make room for new backup files that are to be generated by periodic back up.

Inventors of the current invention (described below) note that the above-described process requires a user to be knowledgeable about the location (e.g. a specific directory or folder), and the names of the back up files to be transferred to tertiary storage and/or deleted. Depending on the size, complexity and/or documentation of the computer system, becoming knowledgeable about the location and names of backup files may be a non-trivial task for most users. Moreover, the above-described manual process of transferring and/or deleting backup files is labor intensive and error prone. For example, if a user decides to delete all files older than a specific date (or to simply delete the oldest file), the user may delete a file that happens to be the last full back up, and without which all incremental back up files of a later date cannot be used. Accordingly, the inventors believe that there is a need for automated deletion of backup files.

Deletion of files (regardless of their type and content) is performed automatically by a prior art feature called "recycle bin" in the operating system "WINDOWS 2000" available from MICROSOFT CORPORATION. The recycle bin, when in use, holds all items that have been manually deleted by a user, from a hard disk in the user's personal computer. Items in the recycle bin remain therein by default until the user manually empties the recycle bin. The user can set a parameter, called "maximum size" of the recycle bin, as a percentage of the total space on the hard disk, which limits the amount of space the recycle bin can use. When the recycle bin fills up, Windows 2000 automatically cleans out enough space in the recycle bin to accommodate storage of more recently deleted files. Windows 2000 apparently deletes files from the recycle bin in a fixed in-built order that is embedded deep within the operating system, and not accessible to the user. Note that to use the recycle bin, the user has to manually mark a file as being deleted (or move the file to the recycle bin) in order for the file to be eligible for being cleaned out by the recycle bin.

SUMMARY

Space on disk, designated to be occupied by certain files (called "recovery files", normally needed by an application, such as a database, to recover from a crash during execution in a computer) is automatically managed in accordance with the invention so as to not exceed a user-specified limit. Specifically, after information to be stored on disk has been automatically created but before a new file containing the information is created, a check is made automatically to see if creation of the new file will cause the total space (to be occupied by the existing files and the new file) to exceed the limit. If the limit is to be exceeded, at least one existing file currently in the space is automatically deleted. Depending on the size of the information, sufficient files are deled to free up space for the new file. The new file is then automatically created, i.e. after space occupied by existing files becomes sufficiently small to accommodate the new file without exceeding the limit.

In some embodiments, the file(s) that are deleted (to make room for the new file) are automatically identified, e.g. in accordance with a user-specified policy and/or a default policy built into the application. Such a predetermined policy may be used in some embodiments to automatically identify, in a list, files available for deletion, prior to the need for deletion even arises. For example, at the time of back up of a file to tertiary storage, the backed up file is automatically marked by some embodiments as being available for deletion whenever a need for space should arise in future.

Regardless of data structures used and steps performed, deletion of files as and when needed, from a disk space that is expressly designated for certain files of an application, and automatic creation of new files only when room is available in the designated space ensures that the size of the designated space automatically stays within a predetermined limit. Therefore methods and systems in several embodiments of the invention automatically eliminate labor and/or errors of the type common in prior art methods.

BRIEF DESCRIPTION OF THE DRAWINGS

FIG. 2 illustrates, in a high-level flow chart, acts performed to implement automated management of the recovery area of FIG. 1 in some embodiments of the invention.

DETAILED DESCRIPTION

Figure 1:
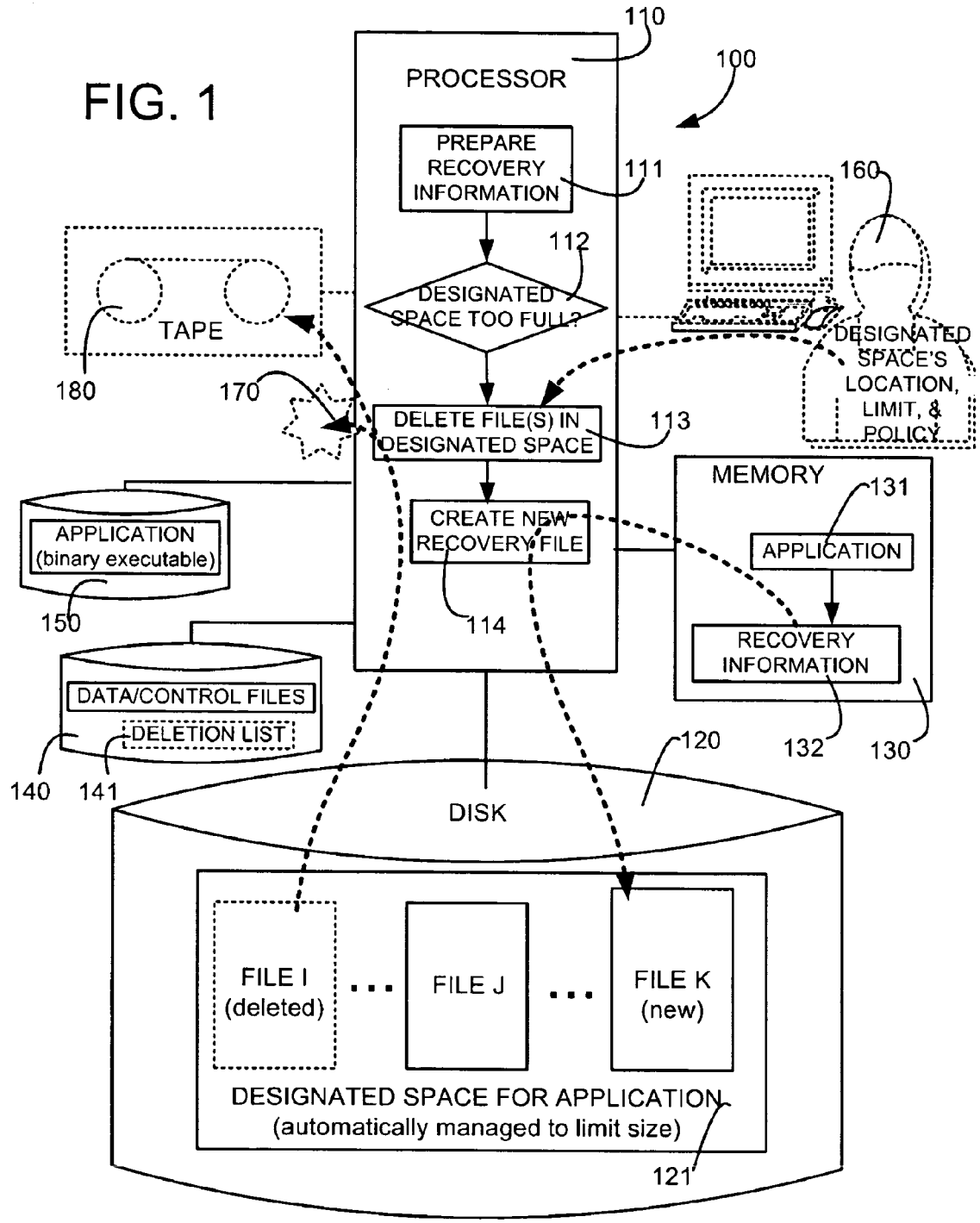
FIG. 1 illustrates, in a high-level block diagram, automated management of an area on disk, designated to hold certain files (such as recovery files), to not grow beyond a limited size in accordance with the invention.

In accordance with the invention, a space 121 (also called "recovery area") on a disk 120 (see FIG. 1) that is designated to hold all recovery files FILE I . . . FILE J for an application 131, is automatically managed to not exceed a predetermined limit that is set by a user 160. Specifically, processor 110 of computer 100 may create (as per act 111 in FIG. 1) information 132 (FIG. 1), to be used in the recovery of an application 131 if application 131 were to crash during execution by processor 110. Such information 132 is initially created in memory 130 and is normally saved to disk 120 in one or more of the above-described recovery files FILE I . . . FILE J. Note that although only a small number of recovery files are shown in FIG. 1, there may be a large number of such files, e.g. 100s of files or 1000s of files depending on the application 131.

Moreover, although application 131 may be any application program, in many embodiments of the invention application 131 is a database application, such as Oracle Database, version 10G, available from Oracle Corporation of Redwood Shores, Calif. In such embodiments, space 121 is designated to hold all recovery files for the database application. In one embodiment, application 131 is not an application program at all but instead it is the operating system itself, and space 121 of this embodiment is designated to hold all files created by the operating system. Therefore, depending on the embodiment, files FILE I . . . FILE J need not be limited to just recovery files, but could be any user-specified type of files (or even all files) that are automatically created in the designated space 121 by a user-specified software program (that may be any kind of application program or even the operating system as noted above).

Prior to creation of a new file FILE K, processor 110 is programmed in accordance with the invention to check (as per act 112) whether such creation will cause space 121 to exceed the user-specified limit. If so, then processor 110, when appropriately programmed in accordance With the invention, automatically deletes at least one file currently in space 121, such as FILE I (as illustrated by arrow 170 in FIG. 1). Processor 110 then creates (as per act 114) new file FILE K (i.e. after deletion of FILE I), when space 121 occupied by existing files (e.g. FILE J) becomes sufficiently small to accommodate the new file FILE K without exceeding the limit.

Automatic management of space 121 by performance of acts 111-114 by processor 110 as described above eliminates the need for user 160 to manually delete such files. In many embodiments, each file FILE I that is deleted from space 121 (when the need arises to store a new file FILE K) is automatically identified, in accordance with a policy that is specified by user 160. Therefore, user 160 has control over how space 121 on disk 120 is managed by computer 100. In many embodiments, user 160 also specifies a location for space 121 that is being automatically managed by computer 100, e.g. by specifying a specific directory or folder (either logical or physical depending on the embodiment).

In the exemplary embodiment illustrated in FIG. 1, disk 120 may be exclusively used for a predetermined type of files (e.g. recovery files or user-specified type of files) being created by application 131, in which case the user may set the location for space 121 to be a drive letter by which the disk is identified (e.g. "D:\>"). Note that binary files for application 131 may be resident in another disk 150, while data and/or control files for application 131 may be resident in yet another disk 140. Note further that, depending on the embodiment, such disks 120, 140 and 150 may be physically distinct disks, or may be simply logical disks that are managed by a volume manager of the type well known in the art.

In the embodiment of FIG. 1, user 160 may specify a predetermined limit for space 121 to be equal to the total size of disk 120 (or some percentage thereof, e.g. 80% so that the remainder is available for storing other files unrelated to application 131, such as files created by operating system). Moreover, the above-described user-specified policy may be applied by processor 110 to automatically identify files available for deletion well ahead of time, i.e. prior to a need for deletion arises, typically when a file in space 121 has been moved to tertiary storage, e.g. as soon as the file FILE I is backed up to tape 180, the file FILE I may be identified as being deletable. However, in alternative embodiments, automatic identification of files to be deleted is performed at other times, e.g. at the time the need arises (i.e. if a result of checking in act 112 is true).

The identity of one or more recovery files to be deleted (such as file FILE I) may be held in a predetermined structure 141, such as a list (called "deletion list") shown in disk 140 of computer 100. Note that although a list is shown and is used as structure 141 in some embodiments, an array or a stack may be used in other embodiments. Files identified as being deletable in the just-described structure 141 form a subset of all files FILE I . . . FILE J that are currently present in designated space 121.

Note that structure 141 of some embodiments is not a listing of all files in space 121, but it is only a small subset thereof. In the just-described embodiments, structure 141 identifies less than half of the files in space 121. In one example, at the time of performance of act 111 (FIG. 1) deletion list 141 may contain just one file name, of file FILE I, that has been identified ahead of time as being deletable. Other embodiments of structure 141 identify all files in space 121 but these embodiments also contain a prioritized order in which the files are to be deleted when the need arises. The prioritized order is not based on time, but instead it is based on a predetermined policy as discussed next.

Files to be identified in deletion list 141 are selected in some embodiments based on one or more user-specified policies and/or one or more default policies that may be prepared by a vendor of application 131 (e.g. based on the recovery information needed to restore application 131). Such predetermined policies (by user and/or vendor) may specify, either individually or in combination, not only which files are to be deleted but the order in which they are to be deleted. For this reason, deletable files identified in structure 141 may be organized in structure 141 in a prioritized order, so that a file of the lowest priority is deleted, whenever space needs to be freed up. The files identified in structure 141 and/or their prioritized order may be changed every time a backup to tape 180 is performed on files in the space 121 that is being automatically managed.

In some embodiments of the invention, processor 110 is programmed to perform a method 200 illustrated in FIG. 2. Processor 110 performs acts 211-214 in a first piece of software that merely copies files between space 121 and another media 180 in response to receiving a job from a user in act 211 whereas a second piece of software creates and deletes files in space 121. When a user job received in act 211 is not to create a file in managed space 121, the two pieces of software run independent of one another, except for transferring information to one another via a common data structure, namely list 141. Note that information transfer between the first and second pieces of software may be done in other ways, e.g. by message passing. When a user job received in act 211 is to create a file in managed space 121, both pieces of software are executed as discussed below.

The first software piece (also called "backup module") is responsive to instructions from user 160, who may submit a job. Therefore, in act 211, processor 110 receives the job, which indicates one or more files to be backed up, restored, or deleted, either to/from an space 121 that is being automatically managed (that is either user-specified at an earlier time or that may be predetermined for an application, depending on the embodiment) and/or to tertiary storage 180 (which may be a magnetic tape or optical disk). User 160 may indicate the files in the job either directly by specifying the path and file name of each file, or indirectly for example by specifying a file type and/or a portion of a file name and/or location of the file(s).

In response to receipt of the job, processor 110 classifies the job as creating a file in the automatically managed area or not (in act 212). If the job is to copy files from managed area to tertiary storage 180, then the job is performed in act 213. If the job is to create a file in the automatically managed area, the second piece of software 230 is executed once. Next, in response to completion of the job, processor 110 automatically applies one or more policies in act 214 (that are either user-specified at an earlier time or that may be predetermined for an application, depending on the embodiment), to update a list 141 of files that are available for deletion from the space 121.

Note that when a user-submitted job affects the automatically managed area (i.e. the answer in act 212 is yes) or when processor 110 itself creates information that is to be saved in a file (either a new file or by increasing the size of an existing file) in space 121, then act 231 is performed. Specifically, normally and routinely when executing application 131, processor 110 may create information which needs to be saved in one or more files in space 121, e.g. recovery files of the type described above or output of any kind of data processing or even files generated by the operating system. In some embodiments, an instance of a database application performs act 220, and in such embodiments, the information being created relates to the recovery of the database application. Examples of such information are found in log files, such as archive logs, online logs, backups and flashback logs of the database application. Therefore, information for such logs is to be created in the normal manner, as per act 220.

When such information is to be written to disk, processor 110 automatically performs acts 231-234 in the second software piece (also called "file creation module"), and hence automatically creates files in space 121. Specifically, in act 231, processor 110 checks if space 121 will exceed a predetermined space limit after saving of the information from memory to disk (e.g. by file creation or file extension). During such checking, processor 110 compares the sum of (space currently used by files already in space 121 and space to be used when writing the new information), with the predetermined limit. Note that although in many embodiments the predetermined limit is set by the user, in an alternative embodiment application 131 may be pre-programmed to specify the limit.

During checking in act 231, if the result is true, then one or more files in the list 141 are deleted in act 232. If list 141 is prioritized, then the lowest priority file is deleted first. Sufficient numbers of files are deleted by the file creation module in order to make space available for the new file(s) to be created. Also in act 232, processor 110 updates list 141. For example, the files that have been deleted are removed from list 141.

Next, in act 233, processor 110 creates the new file(s) in the area 141. Processor 110 may create a new file with a new name that is itself created in act 233, e.g. by including in the file name a time stamp and an indication of the information being stored therein. In case of a database application, the file name of the new file may be added to a table in the database, e.g. in a control file.

After creation of the new file(s), processor 110 performs act 234 to check if the job that resulted in the new file(s) is from a user and if so returns to act 214 (described above) to update list 141 of files that are available for deletion from the space 121. For example in case the user job was to do a backup of files in space 121, then the backed up files are now added to list 141 depending on the default policy. Thereafter, control is returned to act 211 (described above). If the job is not from a user, then processor 110 returns to act 220 (described above) to again create information to be saved.

In some embodiments, creation of the new file(s) in area 141 as per act 233 in the file creation module includes a number of acts that are performed to ensure appropriate recovery if an error (or crash) is unexpectedly encountered during such file creation, as follows. Specifically, a parameter called "reserved space" is first increased, in the amount of the size of the to-be-created new file. Next, a reservation object is created to hold information relating to the file being created (e.g. file name), and the state of the file creation process. Thereafter, the file is created on disk (e.g. by write access to the disk using a file descriptor), followed by destroying the reservation object, and followed by reducing the reservation space. Use of such a reservation object and reserved space will be apparent to the skilled artisan in view of this description.

Although a specific implementation for a database application is discussed next in reference to FIGS. 3A and 3B, this description is merely illustrative and is not to be used to limit the scope of the invention. In the embodiment illustrated in FIG. 3A for a database application, the designated space 121 is also called a recovery area or more specifically a flash recovery area. As noted above, this area 121 is a disk location (directory) or a disk group (managed by a volume manager for example) that has been designated for the database application to create all its recovery related files. For a database application, such as Oracle Database, these files include the control file, the data file, the online log, the archived log; image copies and backup sets. Such recovery related files are used to recover the database when there is crash. To recover the database quickly, these recovery files are preferably kept on disk 120 for as long as possible (i.e. not deleted unless necessary).

Also as noted above, files created in recovery area 121 (FIG. 3A) are automatically purged based on one or more user set policy/policies. In some embodiments, a policy can be specified by the user in two ways namely 'Time based policy' (called recovery window) and 'Number of backups based policy' (called redundancy). An example for 'Time based policy' is to keep all recovery files that are needed to recover the database within a week. An example for 'Number of backups based policy' is to keep last two backups. The number of files purged (e.g. in act 232 described above) is based on amount of disk space needed to create new files.

Effectively, this method keeps the files on disk as long as possible. For example, when the database application finds there is no disk space available to create a file of X bytes (as per act 230 discussed above), it chooses a minimum set of low priority files at least of size X bytes from the deletion list 141 and deletes them. In some embodiments, the just-described method is also implemented in a clustered file system, such as Real Application Clusters in the database application Oracle Database. Specifically, flash recovery area 121 can be in a cluster file system and be shared by more that one instance of a database application running on different machines.

Note that in one embodiment, the database application uses two initialization parameters set by the user: (1) DB_RECOVERY_FILE_DEST-identifies the location (directory) of flash recovery area 121, and (2) DB_RECOVERY_FILE_DEST_SIZE identifies the amount of disk space to be used by the flash recovery area 121. The database application performs one or more of the above-described acts (in FIG. 2) to ensure that it will not consume more than this disk space. For this reason, the second parameter, DB_RECOVERY_FILE_DEST_SIZE is similar to a hard-limit on disk quota for a user.

In order to receive jobs (of the type described above) from a user 180, the database application interfaces to another piece of software 301 (FIG. 3), called recovery manager. The recovery manager 301 (also called "RMAN") is a software tool to assist user 160 in generating jobs for a backup module 302 which in turn performs a backup and/or restore of the database. At beginning of a job, backup module 302 identifies a list 303 of files to be backed up, for example by querying control file 304 via control file module 305. The list 303 is used by backup module 302 to make the copies of files to tertiary storage one at a time. Note that in some embodiments, list 303 may also be used by backup module 302 to make copies of files to flash recovery area 121, On completion of a backup job, backup module 302 provides the list 303 of files that have been copied to tertiary storage or flash recovery area 121, to control file module 305 (as shown by path 311 in FIG. 3A). Control file module 305 then updates deletion list 141, in accordance with a number of policies that are also stored in the control file 304. Note that in this embodiment, deletion list 141 is stored in control file 304. Note further that although control file 304 of some embodiments contains two kinds of policies namely user-specified policies and default policies, in other embodiments only the user-specified policies are stored in control file 304 (and any default policies are stored elsewhere or even hard-coded into a module, such as file creation module 306 or control file module 305).

Deletion list 141 of some embodiments may be implemented as a linked list of deletable files that are sequentially ordered by priority. The deletion list of one embodiment for a database application just contains a key (recid, stamp) of a database table, and the file type. The file name is retrieved, when necessary, from the database table using the key. For example, all the archived logs are stored in archived log table. Using the key, the name of an archived log is retrieved from archived log table. The policies used by the database application to find out whether a file is eligible for deletion or not are classified in this embodiment as follows. They are listed in the highest order of deletion priority (i.e. obsolete files are deleted first, followed by Identical files and so on):

a) Obsolete files: This is a classification of files by user set policy. The files that are not needed to satisfy user set policy are called obsolete files.

b) Identical files: Files that are bit by bit identical are termed as identical files. This policy is automatically enabled by system default (i.e. without user input) in some embodiments, although in other embodiments the user may be allowed to turn on or off this policy.

c) Backed Up files: Files that are copied to tertiary device or to a non-flash recovery area location. This policy is also enabled by system default in one embodiment, but other embodiments may solicit user input on this policy as well.

d) Applied archived logs: This policy is applicable only when a standby database is used. Standby database is a copy of active database. The changes to original database are applied to standby database by shipping the archived log. The archived log is a creation of recovery information (as per act 111) on original database. In this case, there are two copies of archived logs, one at standby and other at original database. User can set this policy to make one of the archived logs eligible for deletion after it is applied on standby database.

In one embodiment, user may set a policy of classifying backup files as obsolete through the tool called Recovery Manager (RMAN). The policy called as Retention Policy is specified in days (called recovery window) or in number of backups (called redundancy). For example, a user can specify the retention policy as a recovery window of 7 days. This user-specified option means, the database application will keep all backup files that are needed to restore and recover the current database to any point in time within last 7 days. Another example is a user can specify the policy as redundancy 2. This user-specified option means, the database application will keep last 2 backups of the database. All backup files that are not needed to satisfy the retention policy or redundancy are obsolete.

The database application of some embodiments identifies obsolete files using following method:

a) Find a list of backup of all data files and control file in the database. If the retention policy is recovery window, then the last backup created before recovery window is fetched. If the retention policy is redundancy, then redundant number of backups is fetched. This list is called as MUST-KEEP-LIST. All backups have a primary key. The MUST-KEEP-LIST is basically a (filetype, primary key) list.

b) Find the lowest checkpoint System Change Number (SCN) from the MUST-KEEP-LIST. This SCN is called as MUST-KEEP-SCN.

c) Now, database application classifies a backup as obsolete or not by a lookup at MUST-KEEP-LIST. If the backup is present in MUST-KEEP-LIST or created Inside recovery window, then the backup is not obsolete. Otherwise, the backup is obsolete.

In the database application of some embodiments, an archive log is applied over the backups to recover the database. So, archived logs that are created later than the backup are not obsolete as they are needed to recover the database. In other words, all archived logs whose SCN is less than the MUST-KEEP-SCN are considered as obsolete. In view of this test (using MUST-KEEP-SCN), archived logs (and a backup if necessary) are retained even if any of them fall outside the recovery window, because they will be needed to recover the database within the recovery window.

The database application of certain embodiments identifies the identical files using following three sub policies: (a) Identical data file copy (b) Identical backup set and (c) Identical archived log. A file is considered as identical if it is bit by bit same. When creation of a new file in area 121 is likely to exceed the limit, there is no need to keep more than one copy of a file. Hence, this policy is enabled by default.

Identical data file copy—Data file copy table (in control file) is updated with (file number, creation time, creation SCN, checkpoint time, checkpoint SCN) after creating a data file copy. Identical data file copies have same (file number, creation time, creation SCN, checkpoint time, checkpoint SCN). So, in this policy, the database application of several embodiments checks to see if there are duplicate data file copies created in flash recovery area with same (file number, creation time, creation SCN, checkpoint time, checkpoint SCN) in data file copy table. If there are duplicate rows in data file copy table, then the database application is programmed to keep the latest row and return all other duplicate rows as eligible for deletion.

Identical backup set—Backup set table (in control file) is updated with (backup set key) after creating a backup set. Identical backup sets have the same backup set key. So, in this policy, the database application of some embodiments checks to see if there are duplicate backup sets created in flash recovery area with same (backup set key) in backup set table. If there are duplicate rows in backup set table, then processor 110 keeps the latest row and returns all other duplicate rows as eligible for deletion.

Identical archived log—Archived log table (in control file) is updated with (sequence, thread) after creating an archived log. The 'sequence' is incremented to distinguish the archive log from another in a database instance. 'Thread' number indicates the instance of a cluster (such as RAC) that generated the archived log. Identical archived logs have the same (sequence, thread). So, in this policy, the database application of certain embodiments checks to see if there are duplicate archived logs created in flash recovery area with same (sequence, thread) as in the archived log table. If there are duplicate rows in archived log table, then the database application keeps the latest row and returns all other duplicate rows as eligible for deletion.

The database application of many embodiments identifies the backed up files using following three sub policies: (a) Backed up data file copy, (b) Backed up backup set, and (c) Backed up archived log. A file is considered as backed up if the file is backed up to tertiary device like tape or a disk location other than flash recovery area location. If a file in flash recovery area is backed up to tape or other disk location, then we can safely delete the file in flash recovery area when there is a need for space. Hence, this policy is enabled by default.

Backed up data file copy—A data file copy can be backed up as backup set to tape/non-flash recovery area location or another data file copy at non-flash-recovery area location. The backed up data file copy are eligible for deletion. a) Backed up data file copy as backup set—A data file copy is uniquely identified by (file number, creation time, creation SCN, checkpoint time, checkpoint SCN). Backup set has meta data information that is captured during backup. This meta data information also includes (file number, creation time, creation SCN, checkpoint time, checkpoint SCN). A data file copy is considered to be backed up as backup set, if there is at least one backup set with a (file number, creation time, creation SCN, checkpoint time, checkpoint SCN) meta data information that matches the data file copy meta data information. b) Backed up data file copy as another data file copy—A data file copy is considered to be backed up as data file copy, if there is at least one data file copy in non-flash recovery area location with a (file number, creation time, creation SCN, checkpoint time, checkpoint SCN) meta data information that matches the flash recovery area data file copy's meta data information.

Backed up backup set—As noted earlier, Backup set table is updated with a backup set key after creating a backup. A backup set is considered as backed up backup set, if there is at least one copy of backup set in non-flash recovery area location or to a tertiary device like tape with same backup set key. The backed up backup set are automatically made eligible for deletion by processor 110.

Backed up archived log—The archive log backup set contains meta data information that is captured during backup. This include (sequence, thread). As noted earlier, archived log table also has (sequence, thread). An archived log is considered to be backed up as backup set, if there is at least one backup set with a (sequence, thread) meta data information that matches the archived log meta data information. The backed up archived logs are automatically made eligible for deletion by the database application of some embodiments.

Applied Archived logs—As noted earlier, this policy is set by user and applicable only when standby database is used. The archived logs that are created by original database are shipped to standby and applied on standby. The archived logs exist on both original and standby database. Generally, user takes backup of archived log either on original or standby database. Hence, there must be some way to automatically purge the archived logs on site where backup of archived logs are not taken. The identification of deletable logs is based on whether the archived log is applied on standby or not. The archived log table (in control file) has a column called APPLIED. It is set to 'YES' if the archived log is applied on standby and 'NO' if the archived log is not yet applied.

User can set a policy either on original or standby database to make applied archived logs eligible for deletion. In this policy, the database application finds the highest SCN in the archived log table whose APPLIED column is set to YES (hereinafter "APPLIED SCN"). All archived logs whose SCN is less than the APPLIED SCN are applied on standby and are automatically made eligible for deletion by the database application.

Figure 3A:
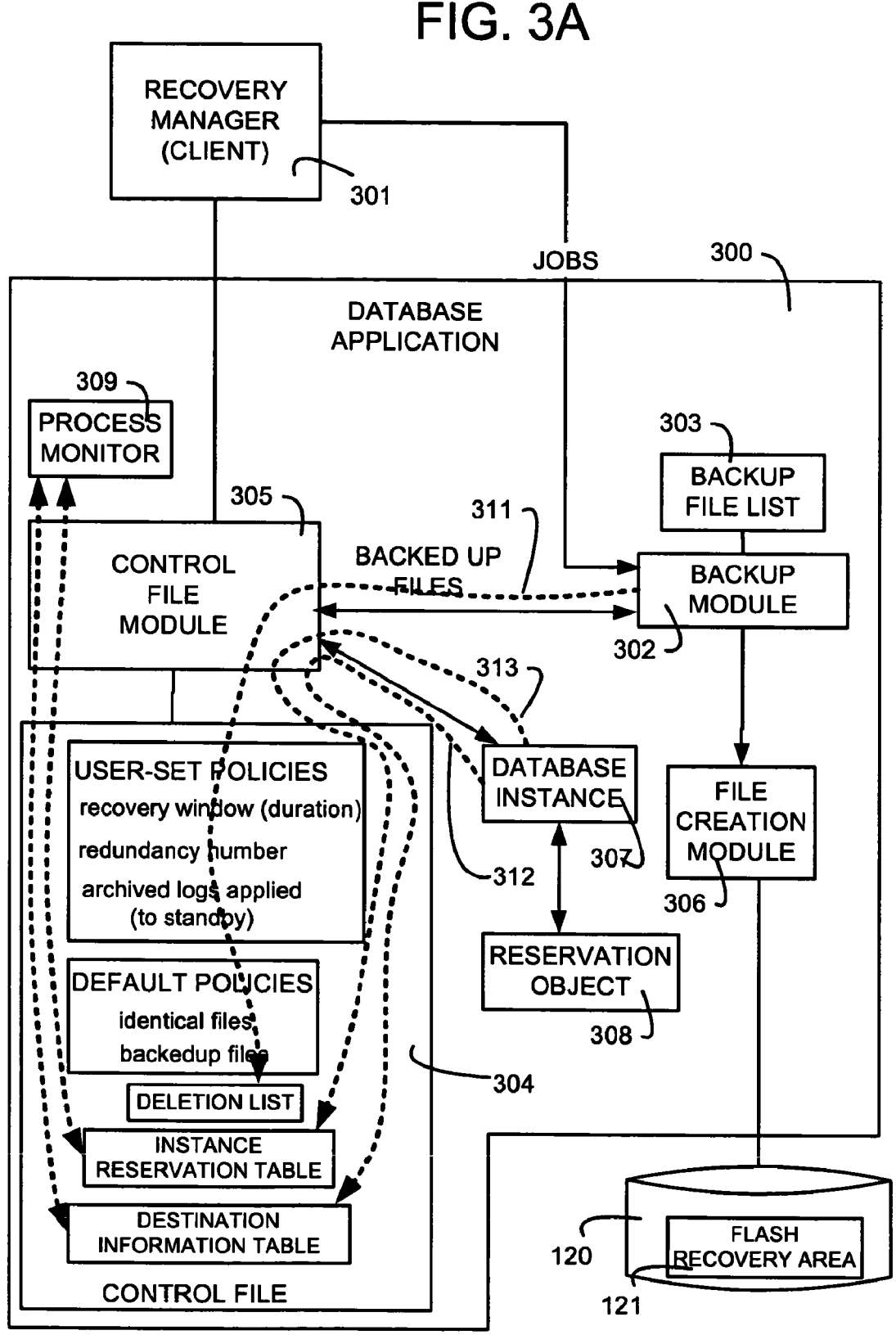
FIG. 3A illustrates, in a detailed block diagram, various modules in a database management system that implements automated management of recovery area in some embodiments of the invention.
Figure 3B:
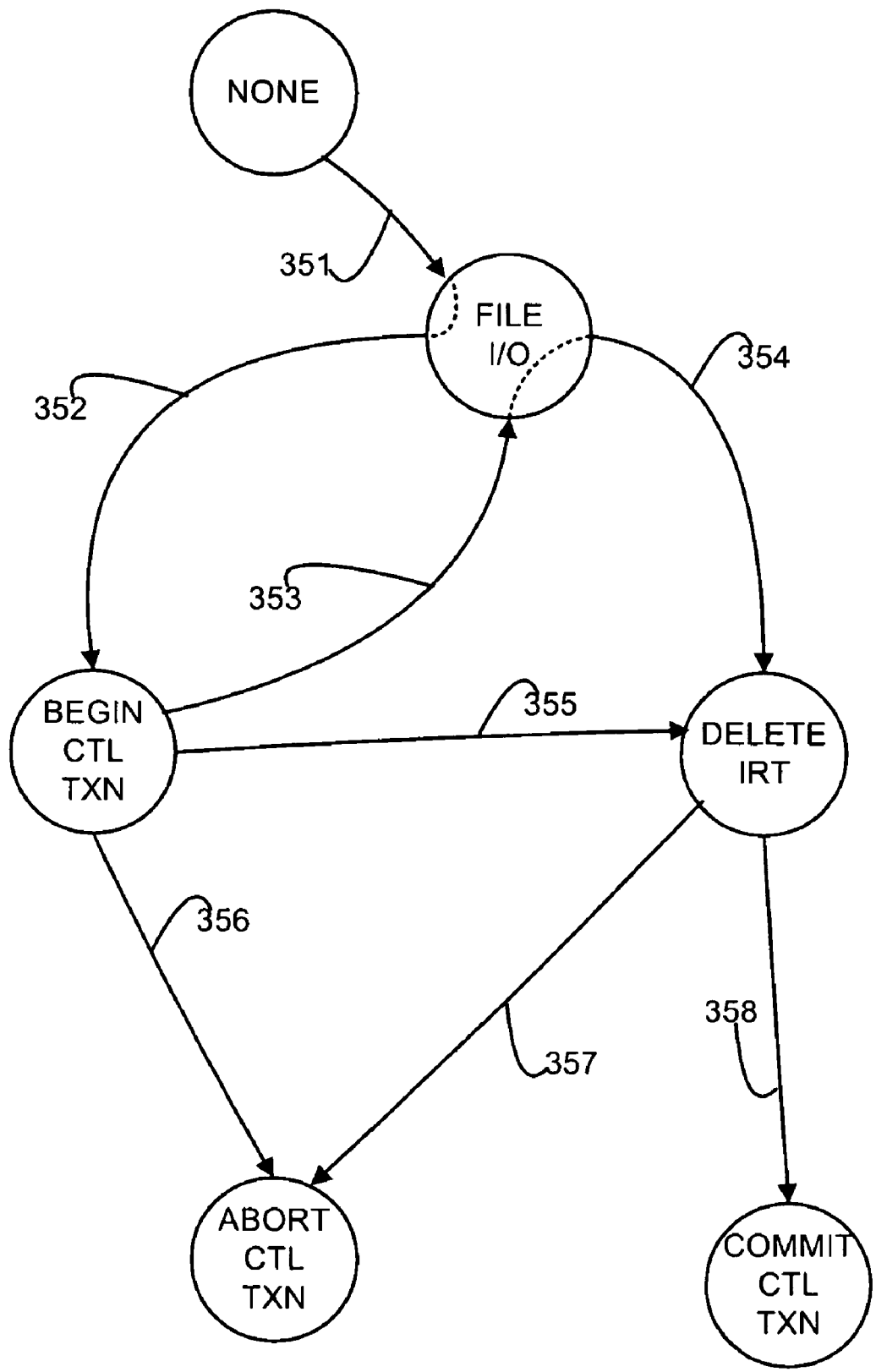
FIG. 3B illustrates, in a state diagram, various states of a reservation object that is used in some embodiments of the invention to maintain the state of file creation, for use in case of unexpected failure of file creation.

Referring to FIG. 3A, at the time of creation of new files in area 121, database instance 307 creates and/or updates two tables: the destination information table and the instance reservation table (as per paths 312 and 313). In addition, database instance 307 also creates and destroys a reservation object 308 in memory. The information held in the two tables and in object 308 is used by a process monitor 309 to recover from an unexpected failure during creation of a new file to contain newly-created recovery information, as discussed next.

The destination information table of several embodiments contains bookkeeping information. There is one row per flash recovery area. Currently, one embodiment of the database application supports one flash recovery area. In embodiments where multiple flash recovery area are supported, this table contains multiple rows. Each row contains (directory name, number of files, used disk space, space reclaimable). 'Used disk space' is the amount of disk space used in flash recovery area. 'Number of files' indicates the total number of files present in flash recovery area. 'Space reclaimable' indicates the amount of disk space that can be reclaimed by deleting files from recovery area.

The destination information table is updated after creating/deleting/resizing a file. When a file creation is complete, 'used disk space' is incremented by the file size and 'number of files' is incremented by 1. Similarly, when the file is deleted, 'used disk space' is decremented by the file size and 'number of files' is decremented by 1. 'Space reclaimable' is incremented by the file size that is added to 'Deletion List'. It is cumulative file size that are present in deletion list. Similarly, when the disk space is freed by deleting files in 'Deletion List', space reclaimable is decremented by the size of the file removed from deletion list.

The instance reservation table of some embodiments contains information about any reservation of disk space that may have been made in the process of file creation. Any process before creating a file needs to reserve disk space of required size. This is needed in order to guarantee the disk space while creating the file. There is one row per database instance involved in embodiments that use a cluster, such as the Oracle Database, Real Application Cluster (RAC). Each row contains (total disk space reservation, timestamp). 'Total disk space reservation' is the total amount of disk space reserved by an instance. The cumulative total disk space reservation of all instances indicates the amount of total disk space reserved by the database. 'Timestamp' indicates the time at which the last reservation is made on this instance.

The instance reservation table is updated before and after creating a file. For example, before creating a file of X bytes, X bytes is added to 'total disk space reservation' and the file creation follows. Once the file creation completes, X bytes is subtracted from 'total disk space reservation'. The current used disk space at any point in time is calculated as sum of 'disk space reservation' (from instance reservation table) and 'Space Used' (from destination information table). This is because 'Space used' indicates the committed disk space and 'disk space reservation' indicates the space used by ongoing file creation.

The reservation object 308 of some embodiments is a state object that contains information about disk space reservation. The purpose of this state object is to undo any reservation made (in instance reservation table) and deleting partially created file if the process crashes before completing the file creation. Reservation state object is in shared memory (called System Global Area in the application Oracle Database), and is created before creating a file and destroyed after file creation. If the process crashes, the reservation state object is destroyed by process monitor 309 which is a background process in database application. There is a one to one relationship between a file and reservation state object in the database application of some embodiments.

The reservation state object 308 of these embodiments contains (file type, disk space reserved, file name, opcode). 'File type' indicates the type of file (backup set, archived log . . . etc) for which reservation is made. 'Disk space reserved' is the amount of disk space reserved (in bytes) for the file to be created. 'File name' is the name of the file created. 'opcode' indicates the various state of reservation object 308. A state diagram of various states is shown in FIG. 3B. There are six states in FIG. 3B, which have the following values: NONE, FILE_I/O, BEGIN_CTL_TXN, DELETE_IRT, COMMIT_CTL_TXN, and ABORT_CTL_TXN. These six states are described next for certain embodiments of the invention (although other embodiments may have fewer states or more states depending on the embodiment).

State NONE—This state is the initial state. Actions such as checking if recovery area is too full (see act 112 in FIG. 1), deleting files in recovery area (see act 113) are performed before entering this state. The disk space is reserved for the file to be created by updating the instance reservation table, but file creation is not yet started. Once the file creation starts (see act 114), the state changes (as shown by arrow 351 in FIG. 3B) from NONE to FILE_I/O.

State FILE_I/O—This state indicates that file input-output to disk has started. Note that file creation may not be complete yet. But, the name of the file is known at this time. It is updated in 'file name' field of reservation state object. If file creation is complete and database is ready to update the file name in control file, processor 110 enters next state BEGIN_CTL_TXN, as show by arrow 352 Even if file creation is not complete but the file I/O operation has to do any book keeping operation in control file, processor 110 enters next state BEGIN_CTL_TXN.

State BEGIN_CTL_TXN—This state indicates that control file transaction has begun. As noted earlier, file creation may be complete at this time. If file creation is complete, processor 110 is ready to update the control file with meta data information of the file that has just been created. Otherwise, processor 110 waits for FILE_I/O to complete, as shown by branch 353. Once the created file's meta data information is updated in control file and processor 110 is ready to update instance reservation table, then processor 110 enters next state DELETE_IRT as shown by arrows 354 and 355 from the respective states BEGIN_CTL_TXN and FILE_I/O.

State ABORT_CTL_TXN—This state indicates that a control file transaction is being aborted. This state is sometimes entered (as shown by arrow 356) after starting in state BEGIN_CTL_TXN. It indicates a failure of processing a create file operation. It can happen when there is some FILE_I/O error or some processing error in state DELETE_IRT (described next and shown by arrow 357).

State DELETE_IRT—This state indicates that file creation is complete and control file is updated with created file's meta data information. Processor 110 is now ready to update the Instance Reservation Table at this state. The file reservation is deleted from instance reservation table and 'Space Used' is incremented in 'Destination Information' table. Processor 110 then enters the next state COMMIT_CTL_TXN, once processor 110 is ready to commit all the changes done so far to control file.

State COMMIT_CTL_TXN—This state indicates that a commit of control file transaction is in progress. The information about the created file, and instance reservation table is committed to control file.

If there is any error in states BEGIN_CTL_TXN and COMMIT_CTL_TXN the control file rolls back the updates by going to state ABORT_CTL_TXN. The various states help to distinguish a process crash and a successful file creation. When the process dies when the state is other is COMMIT_CTL_TXN, the file is not successfully created and hence the incomplete file needs to be cleaned up from disk. When the process crashes, a process monitor 309 does the cleanup. The cleanup action depends on the state at which reservation state object was when crashed. The cleanup action in various states is as follows (in certain embodiments of the invention):

In state NONE—the reservation must be cancelled (i.e. undo the changes to IRT). Note that there are no incomplete files to be deleted.

In state FILE_I/O—if this is a file resize operation, then the incomplete file doesn't need to be deleted. Otherwise, process monitor 309 needs to delete the incomplete file. The reservation must be cancelled.

In states DELETE_IRT, BEGIN_CTL_TXN—processor 110 doesn't know (from just the state alone) whether the control file is really updated with the file information or not. So, process monitor 309 will do a quick scan of control file, looking for the created filename. If the file name is present, then file creation is complete and nothing needs to be done. Otherwise, the incomplete file is deleted. The reservation is also cancelled.

In state ABORT CTL TXN—same as FILE I/O clean up (described above).

In state COMMIT CTL TXN—nothing is done for clean up, as the file creation is guaranteed to be complete, by the database application.

Figure 4:
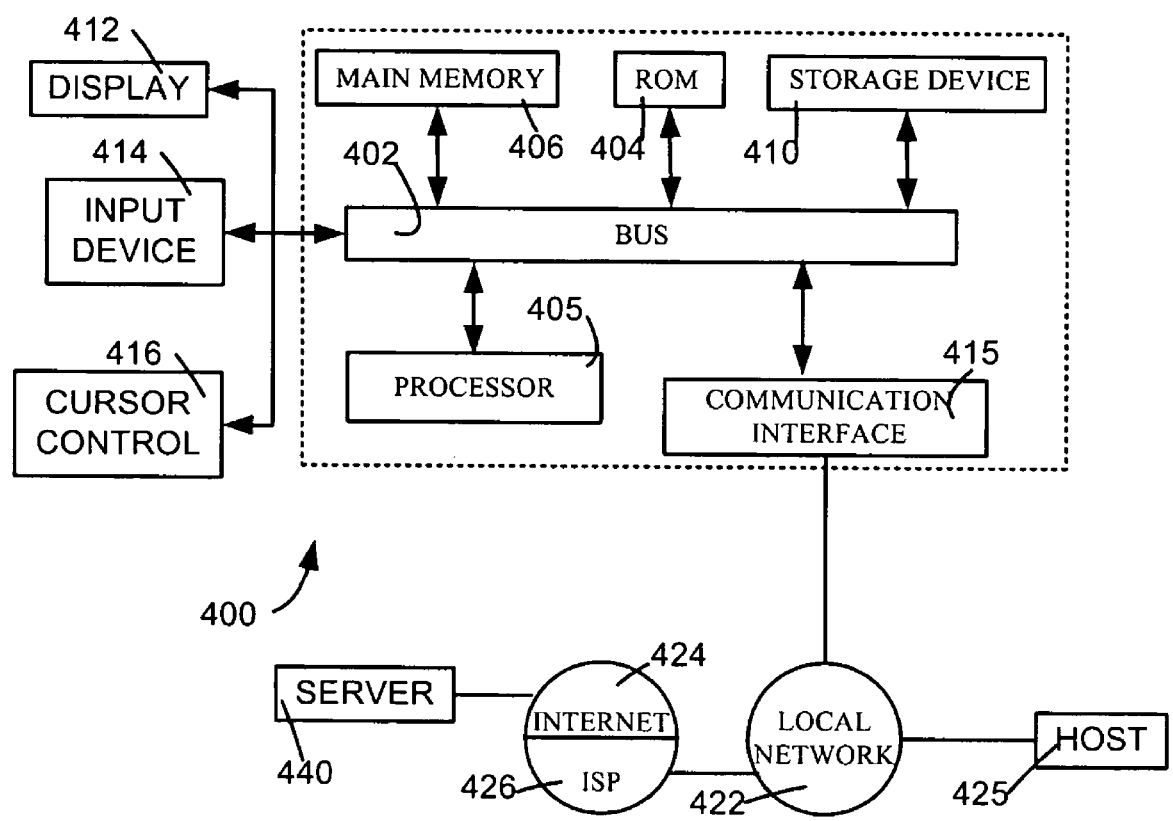
FIG. 4 illustrates, in a high level block diagram, hardware included in a computer that may be used to perform the methods of FIGS. 2A and 2B in some embodiments of the invention.

Computer 100 of FIG. 1 can be implemented by hardware that forms a computer system 400 as illustrated in FIG. 4. Specifically, computer system 400 includes a bus 402 (FIG. 4) or other communication mechanism for communicating information, and a processor 405 coupled with bus 402 for processing information. Computer system 400 also includes a main memory 406, such as a random access memory (RAM) or other dynamic storage device, coupled to bus 402 for storing information and instructions to be executed by processor 405.

Main memory 406 also may be used for storing temporary variables or other intermediate information during execution of instructions to be executed by processor 405. Computer system 400 further includes a read only memory (ROM) 408 or other static storage device coupled to bus 402 for storing static information and instructions for processor 405. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 405. Another type of user input device is cursor control 416, such as a mouse, a trackball, or cursor direction keys for communicating direction information and command selections to processor 405 and for controlling cursor movement on display 412. This input device typically has two degrees of freedom in two axes, a first axis (e.g., x) and a second axis (e.g., y), that allows the device to specify positions in a plane.

As described elsewhere herein, automated disk-oriented backups (which automatically manage space designated to hold recovery files for an application) are provided by computer system 400 in response to processor 405 executing one or more sequences of one or more instructions contained in main memory 406. Such instructions may be read into main memory 406 from another computer-readable medium, such as storage device 410. Execution of the sequences of instructions contained in main memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 405 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 405 retrieves and executes the instructions. The instructions received by main memory 406 may optionally be stored on storage device 410 either before or after execution by processor 405.

Computer system 400 also includes a communication interface 415 coupled to bus 402. Communication interface 415 provides a two-way data communication coupling to a network link 420 that is connected to a local network 422. Local network 422 may interconnect multiple computers (as described above). For example, communication interface 418 may be an integrated services digital network (ISDN) card or a modem to provide a data communication connection to a corresponding type of telephone line. As another example, communication interface 415 may be a local area network (LAN) card to provide a data communication connection to a compatible LAN. Wireless links may also be implemented. In any such implementation, communication interface 415 sends and receives electrical, electromagnetic or optical signals that carry digital data streams representing various types of information.

Network link 420 typically provides data communication through one or more networks to other data devices. For example, network link 420 may provide a connection through local network 422 to a host computer 425 or to data equipment operated by an Internet Service Provider (ISP) 426. ISP 426 in turn provides data communication services through the world wide packet data communication network 428 now commonly referred to as the "Internet". Local network 422 and network 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 440 might transmit a requested code for an application program through Internet 428, ISP 426, local network 422 and communication interface 415. In accordance with the invention, one such downloaded application provides for implementing automated disk-oriented backups for databases, as described herein.

The received code may be executed by processor 405 as it is received, and/or stored in storage device 410, or other non-volatile storage for later execution. In this manner, computer system 400 may obtain application code in the form of a carrier wave.

Numerous modifications and adaptations of the embodiments described herein will be apparent to the skilled artisan in view of the disclosure. For example, although in some embodiments the act of deleting a file, in order to free up space for a new file, is performed automatically by a programmed computer, in other embodiments one or more of such acts are performed by the computer under manual direction (by a human). For example, the computer may display a message to the human identifying a list of files about to be deleted, and delete the files (to free space for new file(s)) only after approval by the human. Therefore, numerous such modifications and adaptations of the embodiments described herein are encompassed by the attached claims.

Moreover, in several embodiments, a computer-readable storage medium (such as but not limited to memory, RAM, ROM and disk) stores instructions to cause a computer to perform various acts of the type described herein.

What is claimed is:

1. A computer-implemented method of managing a first area on a disk in a computer, the method comprising:
   automatically creating in memory information to be used in recovery of a database, from a process crash of a database management system during execution in the computer;
   in response to automatic creation of said information, automatically checking if creation of a new file to contain said information, in the first area will cause a size of the first area to exceed a predetermined limit on the size;
   wherein said predetermined limit is identified in a first parameter; and
   wherein the first area is expressly designated in a second parameter to hold a plurality of files automatically created by the database management system, for use in said recovery from the process crash;
   automatically deleting, from the first area, at least one file in the plurality of files, when a result of said checking is true;
   automatically creating the new file in the first area, when the first area is sufficiently small to accommodate the new file without the size exceeding the predetermined limit; and
   automatically adding a name of the new file to a table in the database;
   wherein the predetermined limit is associated with the first area, and the computer comprises additional space.

2. The method of claim 1 further comprising:
   automatically identifying said at least one file for deletion at a time of back up of said at least one file to tertiary storage.

3. The method of claim 2 wherein:
   said automatically identifying is performed prior to said automatically creating in memory information.

4. The method of claim 1 wherein:
   sufficient space is freed up by said automatically deleting to accommodate said new file without said size exceeding said predetermined limit.

5. The method of claim 1 further comprising:
   automatically increasing a reserved space indicator by a size of said new file prior to said automatically creating said new file; and
   automatically decreasing said reserved space indicator by said size of said new file on successful creation of said new file.

6. The method of claim 5 further comprising:
   subsequent to said automatically increasing, automatically creating a temporary object in memory, prior to creation of said new file on disk;
   automatically maintaining in said temporary object an indication of state of creation of said new file; and
   automatically destroying from said memory said temporary object after creation of said new file on disk;
   wherein said automatically decreasing is performed after said automatically destroying.

7. A non-transitory computer-readable storage medium encoded with instructions to cause one or more computers to perform the method of claim 1.

8. A computer-implemented method of managing space in a disk accessible to a computer, the method comprising:
   using a first parameter to expressly designate a directory, in at least said disk, to hold a plurality of files of a predetermined application;
   using a second parameter to identify a limit on a size of said directory;
   identifying a subset of the plurality of files as being deletable within said directory, prior to a need for deletion;
   subsequent to said identifying, checking if creation of a new file in said directory will cause space in said directory, when occupied by the plurality of files and the new file, to exceed said limit; and
   when a result of said checking is true, then automatically deleting at least one file identified in the subset;
   wherein said computer further comprises at least a remainder space in said disk but outside said directory available for storing other files unrelated to said predetermined application.

9. The method of claim 8 wherein each file in the plurality of files in said directory comprises information to be used in recovery of data of the application from a process crash of the application during execution in said computer, and said new file also comprising information to be used in recovery of the application.

10. The method of claim 8 further comprising:
    subsequent to said checking, automatically creating said new file.

11. The method of claim 10 further comprising:
    automatically increasing a reserved space indicator by size of said new file prior to said automatically creating; and
    automatically decreasing said reserved space indicator by said size of said new file on successful creation of said new file.

12. The method of claim 10 further comprising:
    automatically creating a temporary object in memory, prior to creation of said new file;
    automatically maintaining in said temporary object an indication of state of creation of said new file; and
    automatically destroying said temporary object from said memory after creation of said new file.

13. The method of claim 12 wherein said automatically maintaining comprises setting said state to a single value selected from a plurality of values on occurrence of a corresponding plurality of events, said plurality of values comprising at least:
    a value of time indicating when reserved space indicator is increased.

14. The method of claim 8 wherein:
    said directory is identified with said predetermined application, by a user of said computer.

15. The method of claim 8 wherein:
    said limit on said size of said directory is at least partially based on a percentage specified by a user of said computer.

16. The method of claim 8 wherein:
    said identifying, said checking, and said deleting are all performed automatically.

17. The method of claim 8 wherein:
    the subset is identified automatically, in accordance with at least one policy specified by a user of said computer.

18. The method of claim 17 wherein:
the user-specified policy comprises a duration; and
said automatically identifying comprises including in the subset all files not needed for recovery, of data of the application from a process crash during execution of the application in said computer, to a time in the past which falls within said duration from current time.

19. The method of claim 17 wherein:
the user-specified policy comprises a number of redundancy; and
said automatically identifying comprises including in the subset all files needed for recovery, of data of the application from a process crash during execution of the application in said computer, except for a number of most recent full backup files and any incremental backup files that are based on said most recent full backup files.

20. The method of claim 17 wherein the application is a database management system, said computer is coupled to a standby computer, a file name of the new file is added to a table in a database accessed through the database management system, and a plurality of archived logs are created in said computer by said database application for transfer to said standby computer to be applied therein to a standby database, wherein:
the archived logs comprise changes to the database to be applied to said standby database;
the user-specified policy comprises applied archived logs; and
said automatically identifying comprises including in the subset an archived log after said archived log is applied on said standby database.

21. The method of claim 8 wherein:
during said identifying, a group of files are included in said subset if each file in said group is bit-for-bit identical to another file located elsewhere in said computer.

22. The method of claim 8 wherein:
during said identifying, a group of files are included in said subset if each file in said group is backed up to a tertiary device.

23. The method of claim 8 wherein:
said identifying comprises creating a list of files identified as deletable in said subset.

24. The method of claim 8 further comprising, prior to said identifying:
backing up at least a group of files in said subset to removable media;
wherein said identifying is performed automatically, on completion of said backing up.

25. The method of claim 24 wherein:
said backing up is performed in response to an instruction from a user of said computer.

26. A non-transitory computer-readable storage medium encoded with instructions to be executed by one or more computers the instructions comprising:
first instructions to use a first parameter to expressly designate a directory, in at least said disk, to hold a plurality of files of a predetermined application;
second instructions to use a second parameter to identify a limit on a size of said directory;
third instructions to identify a subset of the plurality of files as being deletable within said directory, prior to a need for deletion;
fourth instructions to check if creation of a new file in said directory will cause space in said directory, when occupied by the plurality of files and the new file, to exceed said limit; and
fifth instructions, responsive to a result of executing the fourth instructions to check being true, to automatically delete at least one file identified in the subset;
wherein said one or more computers further comprise at least a remainder space in said disk but outside said directory available for storing other files unrelated to said predetermined application.

27. The non-transitory computer-readable storage medium of claim 26 wherein:
said directory is comprised in a cluster file system and said directory is shared by more than one instance of said predetermined application.

28. The method of claim 1 wherein:
said first area is comprised in a cluster file system and said first area is shared by more than one instance of said database management system running on different machines.

* * * * *

UNITED STATES PATENT AND TRADEMARK OFFICE
CERTIFICATE OF CORRECTION

| | | |
|---|---|---|
| PATENT NO. | : 7,831,561 B2 | Page 1 of 1 |
| APPLICATION NO. | : 10/849474 | |
| DATED | : November 9, 2010 | |
| INVENTOR(S) | : Steven C. Wertheimer et al. | |

It is certified that error appears in the above-identified patent and that said Letters Patent is hereby corrected as shown below:

In column 3, line 42, delete "With" and insert -- with --, therefor.

In column 6, line 47, delete "log;" and insert -- log, --, therefor.

In column 8, line 8, after "active" insert -- (original) --.

In column 8, line 46, delete "Inside" and insert -- inside --, therefor.

Signed and Sealed this
Second Day of August, 2011

David J. Kappos
*Director of the United States Patent and Trademark Office*